(12) United States Patent
Hu et al.

(10) Patent No.: US 10,240,980 B2
(45) Date of Patent: Mar. 26, 2019

(54) METHODS AND APPARATUS FOR SPECTRAL IMAGING

(71) Applicants: Juejun Hu, Newton, MA (US); Tian Gu, Fairfax, VA (US); Kazumi Wada, Lexington, MA (US); Anuradha Murthy Agarwal, Weston, MA (US); Lionel Cooper Kimerling, Concord, MA (US); Derek Matthew Kita, Cambridge, MA (US); Junying Li, Somerville, MA (US); Fleur Jacolien Fok, Delft (NL)

(72) Inventors: Juejun Hu, Newton, MA (US); Tian Gu, Fairfax, VA (US); Kazumi Wada, Lexington, MA (US); Anuradha Murthy Agarwal, Weston, MA (US); Lionel Cooper Kimerling, Concord, MA (US); Derek Matthew Kita, Cambridge, MA (US); Junying Li, Somerville, MA (US); Fleur Jacolien Fok, Delft (NL)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 15/602,323

(22) Filed: May 23, 2017

(65) Prior Publication Data

US 2017/0299434 A1 Oct. 19, 2017

Related U.S. Application Data

(63) Continuation of application No. PCT/US2015/062509, filed on Nov. 24, 2015.
(Continued)

(51) Int. Cl.
*G01N 21/25* (2006.01)
*G01J 3/12* (2006.01)
(Continued)

(52) U.S. Cl.
CPC ............... *G01J 3/12* (2013.01); *G01J 3/0208* (2013.01); *G01J 3/0218* (2013.01);
(Continued)

(58) Field of Classification Search
CPC ........ G01J 3/02; G01J 3/12; G01J 3/28; G01J 3/44; G01N 21/65; G01N 21/64
See application file for complete search history.

(56) References Cited

U.S. PATENT DOCUMENTS 4,749,248 A * 6/1988 Aberson, Jr. ...... G02B 6/02095
385/24
5,546,181 A 8/1996 Kobayashi et al.
(Continued)

FOREIGN PATENT DOCUMENTS

WO WO 2012/097982 A1 7/2012
WO WO 2013/188520 A2 12/2013

OTHER PUBLICATIONS

International Search Report and Written Opinion issued by the International Searching Authority for International Application No. PCT/US15/062509, dated Feb. 1, 2017, 10 pages.
(Continued)

*Primary Examiner* — Abdullahi Nur
(74) *Attorney, Agent, or Firm* — Smith Baluch LLP

(57) ABSTRACT

An apparatus for generating a spectral image includes a filter to receive incident light. The filter has a variable refractive index. The apparatus also includes a modulator, operably coupled to the filter, to modulate the variable refractive index of the filter so as to generate a plurality of optical patterns from the incident light. The plurality of optical
(Continued)

patterns represents the spectral image and each optical pattern in the plurality of optical patterns corresponds to a different modulation of the variable refractive index. The apparatus further includes a detector, in optical communication with the filter, to detect the plurality of optical patterns.

30 Claims, 7 Drawing Sheets

Related U.S. Application Data

(60) Provisional application No. 62/083,397, filed on Nov. 24, 2014.

(51) Int. Cl.
    G01J 3/02    (2006.01)
    G01J 3/28    (2006.01)
    G01J 3/32    (2006.01)

(52) U.S. Cl.
    CPC ........... G01J 3/0237 (2013.01); G01J 3/2823 (2013.01); G01J 3/32 (2013.01); *G01J 2003/1226* (2013.01)

(56) References Cited

U.S. PATENT DOCUMENTS

| | | | |
|---|---|---|---|
| 6,963,062 B2* | 11/2005 | Cyr | G01N 21/31 |
| | | | 250/227.25 |
| 2003/0156786 A1 | 8/2003 | Pan | |
| 2004/0145741 A1* | 7/2004 | Cole | G01J 3/26 |
| | | | 356/436 |
| 2005/0082480 A1* | 4/2005 | Wagner | G01J 5/60 |
| | | | 250/338.1 |
| 2006/0159411 A1 | 7/2006 | Miller | |
| 2007/0041729 A1* | 2/2007 | Heinz | G01B 11/303 |
| | | | 398/25 |
| 2008/0144001 A1 | 6/2008 | Heeg et al. | |
| 2010/0039644 A1 | 2/2010 | Choi et al. | |
| 2010/0130870 A1 | 5/2010 | Kopriva et al. | |
| 2012/0105843 A1 | 5/2012 | Hirai et al. | |

OTHER PUBLICATIONS

International Preliminary Report on Patentability for International Application No. PCT/US15/062509, dated june 8, 2017, 9 pages.
Redding et al., "Using a multimode fiber as a high-resolution,low-loss spectrometer," Optics Letters, vol. 37, No. 16, dated Aug. 15, 2015, 3 pages.
Saar et al., "Coherent Raman scanning fiber endoscopy," Optics Letters, vol. 36, No. 13, dated Jul. 1, 2011, 3 pages.

* cited by examiner

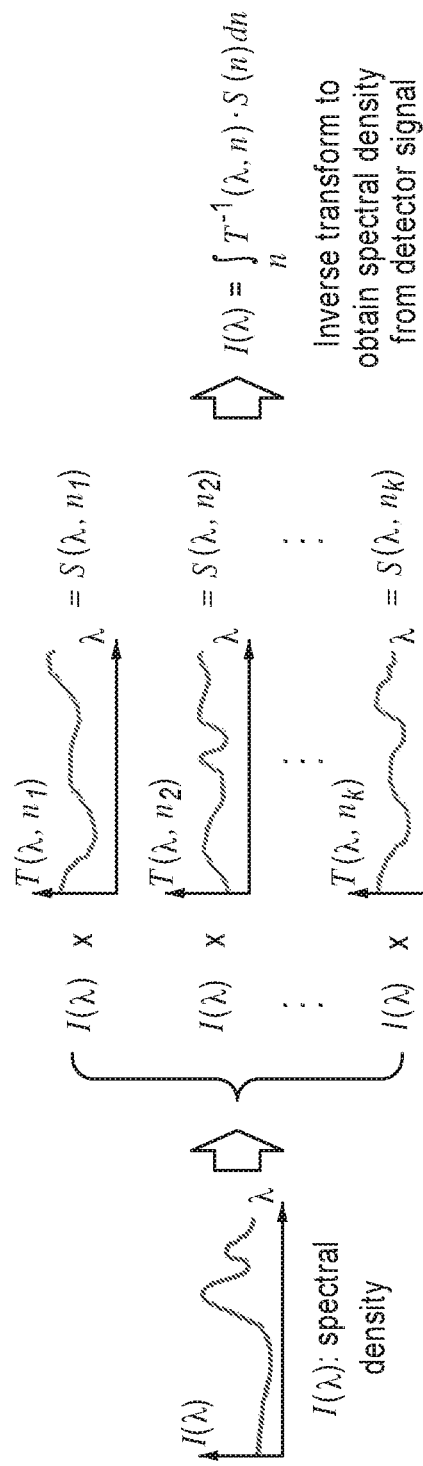

METHODS AND APPARATUS FOR SPECTRAL IMAGING

CROSS-REFERENCE TO RELATED APPLICATION

This application is a bypass continuation of International Application No. PCT/US15/062509, filed Nov. 24, 2015, and entitled "METHODS AND APPARATUS FOR SPECTRAL IMAGING" which in turn claims priority to U.S. Application No. 62/083,397, filed Nov. 24, 2014, entitled "MULTISPECTRAL-HYPERSPECTRAL IMAGING METHOD AND DEVICE," both of which are hereby incorporated herein by reference in its entirety.

BACKGROUND

Spectral imaging combines both imaging and spectroscopy. In general, imaging technology can provide intensity information at points in an image plane I(x, y), where (x, y) designates the location on the image plane. A typical spectrometer, as used in spectroscopy, can provide a single spectrum I($\lambda$), i.e., intensity information at each wavelength $\lambda$ (spectral component). In comparison, spectral imaging can provide a spectral image I(x, y, $\lambda$) that includes spectral intensity at each point in the image plane. Therefore, a spectral image can be viewed as a cube of information (also referred to as a datacube) represented by a three-dimensional (3D) data set, where two dimensions represent spatial coordinates (e.g., x and y) and the third dimension represents a spectral coordinate (e.g., $\lambda$). Conventionally, a spectral image I(x, y, $\lambda$) can be decomposed into either a collection of many images, each of which is measured at a distinct wavelength, or into a collection of pixels, each of which includes a detailed spectral curve.

Unlike conventional color imaging (e.g., with a color camera), which uses only three primary colors, spectral imaging can utilize many more color channels, thereby improving the color differentiation capabilities. In addition, spectral imaging can reach spectral regimes that might not be accessible to conventional color imaging, such as the infrared or Terahertz (THz) regime. Therefore, spectral imaging can be useful when precise spectral or color information is desirable (e.g., to distinguish between similarly colored objects or measure overlapping fluorescent signals) or when an image of the scene is desired (e.g., if the object of interest is not uniformly one color, the area of interest contains multiple objects, or scenes in which a single-point spectrometer would not accurately sample or cover the area of interest).

Spectral images can be acquired via several methods. One method of spectral imaging uses a set of narrow band filters, each of which can transmit light around a particular wavelength (e.g., within a bandwidth of 10 nm). This method captures a full spectral image by measuring one image at a time but each time at a different wavelength.

A similar method can use a variable-filter, such as a circular-variable filter (CVF), liquid-crystal tunable filter (LCTF), or acousto-optical tunable filter (AOTF). A CVF can include a thin film deposited on a circular substrate. The film thickness and therefore the wavelength of the CVF's peak transmittance can vary linearly and continuously with respect to angular position on the substrate, therefore allowing transmission of a narrow-band light as a function of the incident beam location on the filter.

The LCTF and AOTF are generally narrowband electro-optical filters with no moving parts. One example of a LCTF (Lyot design) includes polarizable liquid crystal mounted between two linear polarizers. Varying the voltage applied to the liquid crystal tunes the filter passband. An AOTF can use an acousto-optic crystal, such as Tellurium dioxide ($T_eO_2$), in which acoustic waves propagate. The acousto-optic crystal deforms to form a grating structure that mimics the acoustic waves and transmits or reflects incident light. The specific period of the grating structure and therefore the transmission wavelength of the AOTF can depend on the frequency of the acoustic waves. A common issue with using narrow-band filters is the low optical signal throughput, as a large fraction of light is rejected by filters at any given time.

Another method of spectral imaging uses a grating or a prism to disperse incident light from an object to be imaged so as to acquire hyperspectral information simultaneously on a single imaging pixel array. This method may offer improved signal throughput (also referred to as "snapshot advantage"). However, the spatial resolution and signal-to-noise ratio (SNR) in this method can be limited because the detector pixel arrays are normally divided into sub-arrays, each of which captures only one wave band. The amount of light incident on the pixels can be reduced by spectrum splitting, thereby reducing the SNR, especially in the mid-wave and long-wave infrared.

A third method of spectral imaging can utilize a superposition of the spectral or spatial information and derive the spectral image via the transformation of the acquired data. One example of this method is Fourier spectroscopy, in which spectrum can be measured from the interference of light. An interferometer can split a beam of light into two beams, which are recombined and interfere at the detector, thereby generating interferograms as a function of spectrum. Fourier-transforming the interferograms yields the spectrum. Fourier Transform Infrared (FTIR) cameras may mitigate the SNR issue by capitalizing on the Fellgett/multiplex advantage in spectroscopy. However, these cameras normally also use fragile opto-mechanical moving parts (e.g., scanning interferometers) that may decrease the system robustness and increase the cost (e.g., an FTIR hyperspectral camera from Telops Inc. costs upwards of $750,000).

SUMMARY

Embodiments of the present invention include apparatus, systems, and methods of spectral imaging. In one example, an apparatus for generating a spectral image includes a filter to receive incident light. The filter has a variable refractive index. The apparatus also includes a modulator, operably coupled to the filter, to modulate the variable refractive index of the filter so as to generate a plurality of optical patterns from the incident light. The plurality of optical patterns represents the spectral image and each optical pattern in the plurality of optical patterns corresponds to a different modulation of the variable refractive index. The apparatus further includes a detector, in optical communication with the filter, to detect the plurality of optical patterns.

In another example, a method of producing a spectral image of an object includes filtering light reflected or scattered from the object with a filter. The method also includes modulating a refractive index of the filter so as to generate a plurality of optical patterns. Each optical pattern in the plurality of optical patterns corresponds to a respective refractive index of the filter. The method also includes detecting the plurality of optical patterns and generating the spectral image of the object based at least in part on the plurality of optical patterns.

In yet another example, an apparatus for imaging an object includes an imaging lens to collect light reflected or scattered from the object. A bundle of single mode fibers is disposed at a focal plane of the imaging lens to receive the light collected by the imaging lens. A bundle of multimode fibers is in optical communication with the bundle of single mode fibers to generate an optical pattern from the light collected by the imaging lens. The optical pattern is formed by at least two optical modes of the light propagating in each multimode fiber in the bundle of multimode fibers. A modulator is operably coupled to the bundle of multimode fibers to change a refractive index of the bundle of multimode fibers so as to change the optical pattern. A detector is in optical communication with the bundle of multimode fibers to detect the optical pattern It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 7A-7C illustrate methods of constructing spectral images from spatial images taken with different refractive indices in a filter

DETAILED DESCRIPTION

Overview

To address, at least partially, the issues in conventional spectral imaging techniques, systems and methods described herein transmit light reflected or scattered from an object or scene to be imaged into a filter having a variable refractive index. A modulator is employed to modulate the variable refractive index of the filter. At each distinct refractive index, an optical pattern of the light after the filter is recorded. A linear transform is then carried out over these optical patterns to convert these optical patterns to a spectral image of the object or scene.

Systems and methods described herein do not use narrowband filters to acquire different spectral channels in the spectral image. Instead, spectral channels are reconstructed from the linear transform of the optical patterns, which substantially preserve the intensity distribution and spectral bandwidth of the incident light. The preservation of spectral bandwidth in each optical pattern can result in improved signal-to-noise ratio (SNR) through the Fellgett advantage (also referred to as multiplex advantage). High spatial resolution can be achieved by the preservation of intensity distribution. In addition, systems and methods here do not use complicated moving or steering components, compact and robust apparatus can be constructed.

Figure 1:
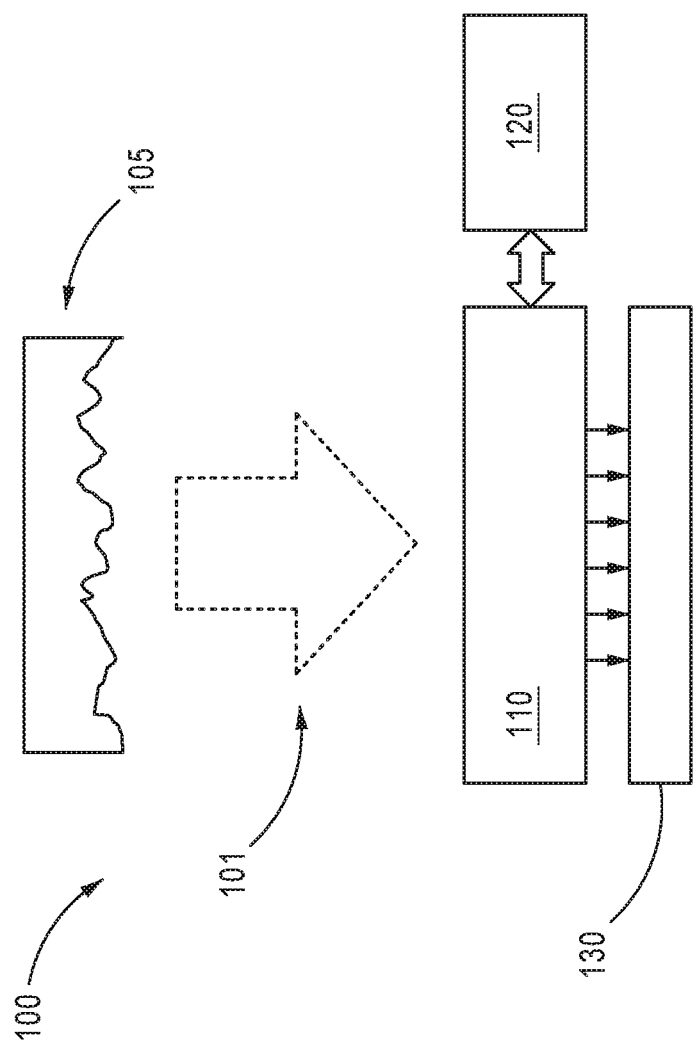
FIG. 1 shows a schematic of a spectral imaging system including a filter and a refractive index modulator.

FIG. 1 shows a schematic of a spectral imaging system that can have high optical signal throughput and high spatial resolution, as well as low cost. The system 100 includes a filter 110 to receive light 101 reflected or scattered from the scene or object 105 being imaged. The filter 110 also generates a plurality of optical patterns from the light 101, each of which corresponds to a respective refractive index of the filter 110 and represents an image of the object 105. The system 100 also includes a modulator 120, operably coupled to the filter 110, to modulate the refractive index of the filter 110. A detector 130 is in optical communication with the filter and detects the plurality of optical patterns generated by the filter 110. A spectral image of the object, including both spatial image information and spectral information of the object, is then generated based on the detected optical patterns.

Without being bound by any particular theory or mode of operation, the operation of the spectral imaging system 100 can be described using linear transformations. In general, signals of light S(w) detected by the detector 130 after filtering by the filter 110 can be written as:

$$S(w) = \int_\lambda T(\lambda, w) \cdot I(\lambda) \, d\lambda \tag{1}$$

where I(λ) is shorthand for I(x, y, λ) that denotes the spectral image information of the light 101 to be evaluated and include both spectral density information and spatial intensity information (also referred to as spatial image information). T(λ, w) is a transmission function representing the effect of the filter 110 on the light, where w can be an arbitrary parameter of the filter 110 than can influence the transmission of light 101 through the filter 110. In the system 100, w is the refractive index of the filter 110.

In many cases, the transmission function T(λ, w) of the filter 110 can be expressed as a linear transform function, in which case the spectral image I(λ) can be retrieved from the detected signal S(w) via an inverse linear transform:

$$I(\lambda) = \int_w T^{-1}(\lambda, w) \cdot S(w) \, dw \tag{2}$$

Therefore, once S(w) is experimentally measured, the spectral image I(λ) can be extracted via an inverse linear transform $T^{-1}$, which can be determined from calibration.

As known in calculus, an integral of a function can be approximated by a summation. The summation corresponding to the integral in equation (2) can be written as:

$$I(\lambda)=\Sigma_{w_1}^{w_2} T^{-1}(\lambda,w) \cdot S(w) \Delta w \qquad (3)$$

Therefore, in practice, the spectral image $I(\lambda)$ of the object 105 can be acquired by scanning the parameter w within a practical range between $w_1$ and $w_2$ and taking the optical pattern $S(w)$ corresponding to each value of w. $\Delta w$ is the step size of the scanning, i.e., the difference of w between adjacent steps. The spectral image $I(\lambda)$ of the object 105 can be generated by performing the summation given in equation (3).

In general, T can be an arbitrary linear function. This degree of flexibility allows the use of various types of filters 110 based on application-specific considerations (e.g., robustness, SNR, system integration, etc.) without being limited to dispersive elements or interferometers. In addition, this method can eliminate the use of narrow-band filters, thereby maintaining a high optical throughput. Furthermore, since the filter 110 can be substantially uniform (e.g., smooth or homogeneous), each optical pattern detected by the detector 130 can represent a good spatial image of the object 105, thereby achieving a high spatial resolution.

Modulation of Refractive Index

The filter 110 in the system 100 has a variable refractive index that changes in response to modulation applied by the modulator 120. In general, a filter 110 whose refractive index has larger dynamic range (a larger difference between $w_1$ and $w_2$ in equation (3)) can produce a spectral image that includes more detailed spectral information (e.g., larger bandwidth), as seen from equation (3). In some examples, the change of refractive index of the filter 110 can be more than 1.5 (e.g., change the absolute value of the refractive index from less than 1.5 to more than 3). In some examples, the change of refractive index of the filter 110 can be more than 1. In some examples, the change of refractive index of the filter 110 can be more than 0.5.

The step size of the refractive index modulation $\Delta w$ (i.e., change of refractive index between adjacent modulation steps) can also influence the resulting spectral image $I(\lambda)$. In general, a smaller step size $\Delta w$ can increase the spectral resolution in the resulting spectral image $I(\lambda)$, because the summation as shown in equation (3) is closer to the integral shown in equation (2). In some examples, the step size $\Delta w$ can be about $2 \times 10^{-3}$ to about $10^{-1}$. In some examples, the step size $\Delta w$ can be about $5 \times 10^{-3}$ to about $2 \times 10^{-2}$. In some examples, the step size $\Delta w$ can be about $2 \times 10^{-3}$ to about $5 \times 10^{-3}$. In practice, the step size may be selected in real time. For instance, the step size can depend on, for example, the number of resolvable spectral components in the object or scene being imaged. For example, if the object includes only limited number of colors and the application does not need precise distinction between different color components, the step size $\Delta w$ can then be larger so as to allow fast acquisition of data (since smaller number of images are taken).

In some examples, a single step size $\Delta w$ can be used throughout the entire image taking. In some examples, different step size $\Delta w$ can be used at different regions of the refractive index. For example, smaller step sizes $\Delta w$ can be used when the inverse transmission function $T^{-1}$ is more sensitive to the refractive index so as to more accurately approximate the summation in equation (3) to the integral in equation (2).

The modulation of the refractive index of the filter 110 can be carried out at a modulation frequency f, which can be defined as the inverse of reciprocal of the time t to change the refractive index by one step size $\Delta w$ (i.e. f=1/t). The modulation frequency can depend on several factors including, but are not limited to, the response time of the filter 110 to the modulation, the frame rate of the detector 130, and the characteristic time of possible motion of the scene or object 105 being imaged. In general, a shorter filter response time and/or higher frame rate allows a higher modulation frequency. Similarly, if the object 105 is moving fast, it can be helpful to have a higher modulation frequency so as to complete spectral imaging within a shorter period of time. Wide ranges of modulation frequencies can be used here. In some examples, the modulation frequencies can be about 5 Hz (e.g., manual modulation) to about 10 GHz (e.g., electro-optic modulation in $LiNbO_3$ crystals). In some examples, the modulation frequencies can be about 100 Hz to about 1 GHz. In some examples, the modulation frequencies can be about 1 KHz to about 100 MHz. In some examples, the modulation frequencies can be about 1 MHz to about 10 MHz.

In some examples, the refractive index modulation is periodic. In this case, the refractive index is scanned between minimum and maximum values multiple times so as to, for example, take multiple images at each point of refractive index. In some examples, the scanning can be linear, in which case the refractive index is monotonically adjusted from minimum to maximum (or from maximum to minimum). But at each point of refractive index, multiple images can be taken before the refractive index is adjusted to the next point.

Various materials and configurations can be used to construct the filter 110. Similarly, various methods of refractive index modulation can be employed by the modulator 120.

In some examples, the filter 110 includes a monolithic plate or film comprising materials that have a variable refractive index. Many materials can exhibit a variable refractive index in response to external fields, including mechanical force (e.g., strain, shear, compression, and stretching), electric field (e.g., through electron-optic effects), thermal field (e.g., through electro-thermal effect), magnetic field (e.g., through magneto-optic effect), acoustic field (e.g., through acousto-optic effect), or any other means known in the art.

In some examples, the filter 110 comprises liquid crystal cells, which can be fabricated using existing techniques such as those used in liquid crystal displays. Applying a voltage over a liquid crystal can change the refractive index of the liquid crystal. Liquid crystals also have high birefringence, so they can create a large optical path difference (OPD) between one polarization and another polarization with modest voltages.

In some examples, the filter 110 comprises an electro-optic (EO) polymer, such as amorphous Polycarbonate and polymethyacrylate. In some examples, the filter 110 comprises electro-optic ceramics, which can be transparent oxide materials. Some electro-optic ceramics can have a crystallography structure that is perovskite type with the formulation of $ABO_3$. Typical representations of this family can be $Pb_{1-x}La_x(Zr_yTi_{1-y})_{1-x/4}O_3$(PLZT), $Pb(Mg_{1/3}Nb_{2/3})O_3$—$PbTiO_3$(PMN-PT), and $Pb(Zn_{1/3}Nb_{2/3})O_3$—$PbTiO_3$ (PZN-PT). More details can be found in U.S. Pat. No. 6,746,618, which is hereby incorporated herein by reference in its entirety.

In some examples, the filter 110 comprises electro-optic crystals such as lithium tantalite (($LiTaO_3$), lithium niobate ($LiNbO_3$), magnesium-oxide-doped lithium niobate (MgO:

LiNbO3), and Potassium titanyl phosphate (KTP) crystals. The refractive index of these materials can depend on an applied electric field.

In some examples, the filter 110 comprises a phase change material, which can simultaneously include two or more materials phases. The refractive index of the phase change material can be tuned by modifying the composition of these co-existing phases. In some examples, the phase change material includes one or more chalcogenide alloys (e.g., GeSbTe or GST) that can have an amorphous and a crystalline phase. In some examples, the phase change material includes Mott insulators (e.g. $VO_2$) that can have a metal phase and an insulator phase.

In some examples, the filter 110 can include waveguide structure(s) comprising one or more types of materials having a variable refractive index. Compared to monolithic plates, waveguide structures can be more sensitive to the modulation. In some examples, the filter 110 includes a multimode waveguide for the light used for imaging. The output of the multimode waveguide is a mixture of multiple modes that are supported by the waveguide and can depend on the refractive index of the waveguide. In some examples, the multimode waveguide can be a semiconductor waveguide fabricated using Silicon on insulator (SOI) technologies. In some examples, the multimode waveguide can include a multimode fiber.

In some examples, the waveguide structure of the filter 110 can include an array of multimode waveguides. For example, the waveguide structure can include an array (one dimensional or two dimensional) of semiconductor waveguides fabricated on a substrate. In this example, the detector 130 may also be fabricated on the same substrate so as to form a compact and integrated apparatus. Each waveguide can be corresponding to a pixel in the detector 130. In another example, the waveguide structure of the filter 110 can include a bundle of multimode fibers, each of which illuminates to a corresponding pixel in the detector 130.

In some examples, the filter 110 can include a waveguide structure infiltrated with another material having a variable refractive index so as to, for example, further improve the dynamic range of the refractive index. For example, the filter 110 can include fiber(s) infiltrated with liquid crystal. In another example, the filter 110 can include hybrid sol-gel/polymer waveguides, in which sol-gel waveguide core are surrounded by electro-optic polymer claddings. Some examples can be found in U.S. Pat. No. 7,912,327, which is hereby incorporated herein by reference in its entirety.

In some examples, the filter 110 can include a composite material. For example, the filter 110 can include one material with good mechanical strength so as to support another material with large dynamic range of refractive index. In another example, the filter 110 can include one material that is insulating to enclose another material that might be conductive so as to allow effective electro-optic modulation (e.g., avoid current running through the conductive material).

In some examples, the filter 110 can include a multi-layer structure, in which two or more materials can be used in alternating layers. Each layer in the multi-layer structure can have a thickness smaller than the wavelength(s) used for imaging such that the incident takes the filter as an anisotropic medium according to effective medium theory. The refractive index of the multi-layer structure can be tuned by mechanical, electrical, magnetic, thermal, and acoustic methods as known in the art. Some examples can be found in U.S. patent application Ser. No. 14/630,080, which is hereby incorporated herein by reference in its entirety.

In some examples, the filter 110 includes composite polymer film comprising alternating layers of an elastomer and a glassy polymer or two different elastomers. Each layer can have a thickness smaller than the wavelength(s) of light used for imaging. The refractive index of the composite polymer film can be varied by compressive forces, extensive forces, or shear forces. More details can be found in U.S. Pat. No. 7,255,914, which is hereby incorporated herein by reference in its entirety.

In some examples, the filter 110 can comprise quantum dots dispersed in a solid matrix. Each of the quantum dots includes a combination of a negatively charged accepter and a positively charged atom. The outermost electron shell of the positively charged atom is fully filled with electrons so that an additional electron can occupy an upper different shell orbital. An electron injector can inject an electron into the quantum dots through the solid matrix. The refractive index of the filter 110 can be adjusted by applying an electric field over the filter 110. More details can be found in U.S. Patent Publication No. 20060163556 A1 and U.S. Pat. No. 7,732,806, each of which is hereby incorporated herein by reference in its entirety.

Depending on the materials and configurations of the filter 110, various means of refractive index modulation can be used by the modulator 120. In some examples, the modulator 120 is configured to apply a mechanical force to the filter 110 so as to modulate the refractive index of the filter 110. The mechanical force can be applied via, for example, compression, bending, stretching, shearing, or any other means known in the art.

In some examples, the modulator 120 is configured to apply an electric field to the filter 110 so as to modulate the refractive index of the filter 110. The electric field can be applied via two electrodes attached to the filter 110 with one electrode attached to the side of the filter 110 receiving the light 101 and the other electrode attached to the opposite side that is coupled to the detector 130. The electrodes can be substantially transparent to allow light transmission. Alternatively or additionally, the electrodes can be attached to a perimeter of the filter 110 so as to allow light to transmit through the central portion of the filter 110.

In some examples, the modulator is 120 configured to vary a temperature of the filter 110 so as to modulate the refractive index of the filter 110. In some examples, the filter 110 can include semiconductor waveguides and the temperature of the waveguides can be tuned by a heater (e.g., a semiconductor heater) fabricated nearby the waveguides on the same substrate.

In some examples, the modulator 120 is configured to apply an acoustic field to the filter 110 so as to modulate the refractive index of the filter 110. In some examples, the modulator 120 can use a combination of two or more modulation methods described here.

The detector 130 in the system 100 can include different cooled or uncooled focal plane arrays, such as CCDs or CMOS imagers to adapt to different spectral ranges and meet diverse application needs. In some examples, the detector 130 can include photodiodes. In some examples, the detector 130 can include single photon detectors such as avalanche photodiodes (APDs) or Geiger-mode APDs.

Spectral Imaging Systems Including Multimode Fibers

In some examples, multimode waveguides can be used as the filter 110 in the system 100 shown in FIG. 1. Without being bound by any particular theory or mode of operation, when polychromatic light $I(\lambda)$ is coupled into a multimode fiber of length L, the total output intensity measured using a detector at the end facet is given by:

$$S(n) = \int_\lambda \sum_j C_j(\lambda, n) \cdot I(\lambda) \cdot \exp[i\beta_j(\lambda)L] \cdot d\lambda \quad (4)$$

Here $C_j$ is the lumped coupling coefficient into and out of the jth guided mode which can depend on both wavelength $\lambda$ and the waveguide transverse index distribution n, and $\beta_j$ denotes the propagation constant of the jth mode. Since equation (4) is linear with respect to $I(\lambda)$, $$\sum_j C_j(\lambda, n) \cdot \exp[i\beta_j(\lambda)L]$$

can serve as the transformation function T in equation (1). Therefore, the spectral information of $I(\lambda)$ can be obtained by scanning the transverse index distribution n (equivalent to w in equation (1)) and monitoring the light intensity incident on the detector at the output of the multimode waveguide. Since the transform function T is linear, the number of spectral channels can be equal to the number of discrete index values n. The transformation function T can be determined through a calibration step where the imager is sequentially illuminated with monochromatic light while the multi-mode transmission spectra are recorded at each spectral channel.

Figure 2A:
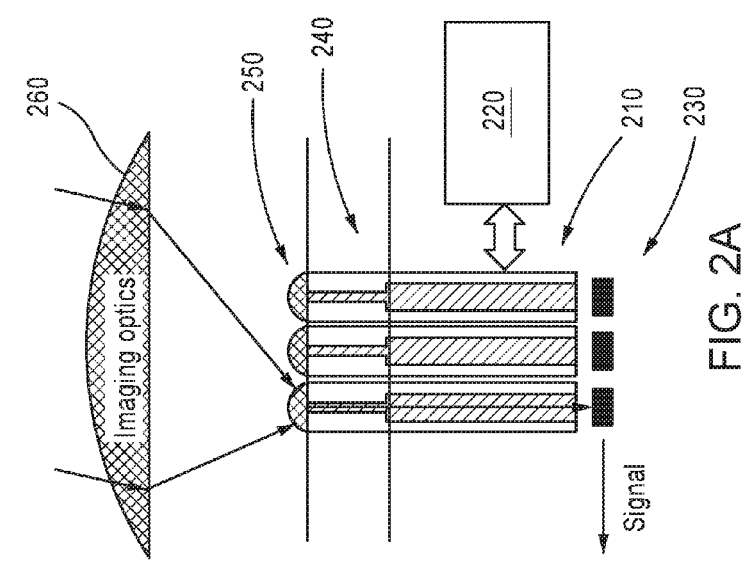
FIGS. 2A-2C illustrate a spectral imaging system including a bundle of multimode fibers.
Figure 2B:
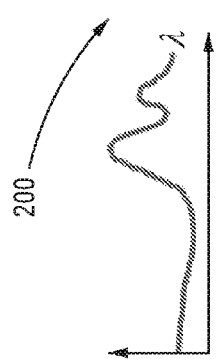
Figure 2C:

FIGS. 2A-2C illustrate a spectral imaging system 200 that uses multimode fibers as a filter. The system 200 as shown in FIG. 2A includes an imaging lens 260 to collect light reflected or scattered from an object or scene (not shown in FIG. 2A) to be imaged. A bundle of single mode fibers (SMF) 240 is disposed approximately at the focal plane of the imaging lens 260, to receive the light collected by the imaging lens 260. A bundle of multimode fibers (MMF) 210 is butt-coupled to the SMF bundle 240 to generate an optical pattern from the light collected by the imaging lens 260. The optical pattern comprises at least two optical modes of the light propagating in each multimode fiber in the MMF bundle 210. The system 200 also includes a modulator 220, operably coupled to the MMF bundle 210, to change the refractive index of the MMF bundle 210 so as to change the optical pattern. A detector 230 is in optical communication with the MMF bundle 210 to detect the optical pattern and generate spectral images of the object. FIG. 2B shows the spectral image $I(\lambda)$ to be retrieved from the system. FIG. 2C shows the transmission function T that is dependent on both the wavelength $\lambda$ of the light and refractive index n of the MMF bundle 210. For a particular refractive index n, signals detected S(n) can be $S(n)=T(\lambda, n)$.

The system 200 operates as follows: light focused by the imaging lens 260 impinges on the MMF bundle 210, exciting multiple optical modes in each MMF in the MMF bundle. As the optical modes propagate in the MMF bundle 210, they coherently interfere with each other. This modal interference depends on the wavelength of the incident light, the refractive index of the MMF fiber, and the length of the MMF bundle, among other things. Consequently, the MMF bundle 210 can exhibit wavelength-dependent transmission at the output. This multi-mode beating transmission spectrum can be sensitive to model structure of the multimode fibers and hence the fiber transverse index distribution. In practice, a series of spectra S(n) can be collected by each pixel at a discrete set of transverse index values n, and the hyperspectral information can be subsequently extracted by performing the inverse transform of equation (2) or the summation of equation (3).

Compared to traditional hyperspectral imaging (HSI) systems based on spectrum-splitting, the system 200 can address the SNR issues by maximally preserving the light intensity incident on each detector pixel without compromising the spatial resolution or involving delicate interferometric optics. In the system 200, light at substantially all wavelengths can be recorded simultaneously in each image, rather than sequentially as in dispersive spectroscopy. This can result in the Fellgett advantage (also referred to as multiplex advantage), which dictates that the SNR in the system 200 can be improved by $\sqrt{N}$ times at the same frame rate for a system with N spectral channels, leading to more than an order of magnitude performance enhancement for HSI imagers (typically with N>100). In addition, the system 200 does not include moving parts such as Fourier transform interferometers, thereby increasing the system reliability and robustness in a field deployed setting.

In the system 200 shown in FIG. 2A, the focal plane of the imaging lens 260 is decoupled from the detector array 230 (i.e., not directly coupled but via the fiber bundles). In imaging spectrometers in the IR region one concern is radiation from the optical elements in the system, which can limit system sensitivity and calibration. Conventional spectral imaging systems usually use cold filtering or shielding components between the optical elements and the detector array. This may further limit choices of optical architectures (due to issues such as central obscuration, introduced vignetting, etc.) and system packaging approaches to realize an efficient and compact HSI system. By spatially decoupling the detector array from the imaging optics and spatial filtering via the light-guide structures, the system 200 can significantly reduce the background irradiation from the optical train onto the detector 230, thereby providing more flexibility to the optical system design and integration with easier thermal management.

In some examples, the system 200 also includes a micro-lens array 250 integrated to the facet of the SMF bundle 240. The SMF bundle 240 can function similarly to entrance collimator slits in bench top spectrometers and ensure reproducible optical coupling into the MMF bundle 210. The optical coupling can be further improved by the micro-lens array 250. In some examples, each fiber in the SMF 240 bundle has a corresponding micro-lens in the micro-lens array 250 on the facet, i.e., the coupling between the SMF bundle 240 and the micro-lens array 250 is one-to-one. In other examples, one micro-lens in the micro-lens array 250 can cover more than one fiber in the SMF bundle 240 (i.e. a few fibers share one micro-lens in the array to simplify alignment).

In some examples, the SMF bundle 240 can also act effectively as a spatial filter by placing the SMF bundle 240 close to the focal plane of the imaging lens 260. This spatial filter can, among others, provide cleaner wave fronts at the output of the SMF bundle 240 and reduce stray-light, thereby improving image quality by increasing the sharpness of the effective point spread function (PSF) of the optical system and decreasing the noise level.

In some examples, the SMF bundle 240 can be arrayed to have a curved end surface to reduce aberration in the light and improve optical signal collection. Using the SMF bundle 240 for aberration correction can reduce the number of optical elements and thus system complexity and/or size that are otherwise required to correct aberrations. The SMF bundle 210 can also increase optical transmission by having less optical surfaces.

In some examples, each fiber in the SMF bundle 240 is coupled to a corresponding fiber in the MMF bundle 210. For example, an end coupler including multiple fixtures can be used to receive the SMF bundle 240 on one side and to receive the MMF bundle 210 on the other side so as to achieve one-to-one coupling between the SMF bundle 240 and the MMF bundle 210. In some examples, the alignment between the SMF bundle 240 and the MMF bundle 210 can be less precise, since variation of optical transmission due to potential misalignment can be taken into account by calibration steps.

The number of fibers in the MMF bundle 210 can depend, for example, on the desired spatial resolution of the imaging system 200. In the system 200, for each spatial channel, a single pixel (rather than an imaging array) records the intensity variation of the light transmitted by each MMF in the MMF bundle 210 as the light guiding properties of the MMF bundle 210 are tuned. In general, one fiber in the MMF bundle 210 can represent one spatial channel, which means that a larger number of fibers in the MMF bundle 210 can result in a higher spatial resolution. In some examples, each fiber in the MMF bundle 210 can be coupled to a pixel element in the detector 230 (i.e., one-to-one coupling). In some examples, the MMF bundle 210 includes about 16 to about 50,000 fibers. In some examples, the MMF bundle 210 can include more than 50,000 fibers.

In some examples, the number of optical modes in the MMF bundle 210 can be greater than 3. In some examples, the number of optical modes in the MMF bundle 210 can be greater than 20 and can be up to several thousand. The number of optical modes in the MMF bundle 210 and therefore in the optical pattern detected by the detector 230 can depend on, for example, the dimensions, shape, and material of the fibers in the MMF bundle 210.

The length of the fibers in the MMF bundle 210 can depend, for example, on desired spectral resolution of the imaging system 200. Without being bound by any particular theory or mode of operation, the spectral resolution of the system 200 can be written as:

$$\delta\lambda = \frac{n_{eff}\lambda^2}{4\pi L \Delta n \cdot (n_{core} - n_{clad}) \cdot SNR} \quad (5)$$

where $n_{eff}$ is the fiber mode effective index, L is the multimode fiber length, $\Delta n$ is the transverse index perturbation, SNR is the detector pixel signal-to-noise ratio, and $n_{core}$ and $n_{clad}$ denote the fiber core and cladding indices, respectively.

Therefore, the spectral resolution of the system 200 can be adjusted by, among other things, adjusting the length of the multimode fibers. In some examples, when a chalcogenide fiber of 10 cm long is used, a spectral resolution of 0.5 cm$^{-1}$ can be achieved. This resolution is comparable or even superior to state-of-the-art hyperspectral imagers. In some examples, the length of the MMF bundle 210 can be greater than 5 cm. In some examples, the length of the MMF bundle can be greater than 20 cm or greater than 50 cm.

The modulator 220 can employ various methods to modulate the refractive index of the MMF bundle 210. These methods include, but are not limited to, stress-optic, electro-optic, or thermo-optic modulation. In some examples, the MMF bundle 210 includes infrared chalcogenide glass fibers for these refractive index modulation methods. In some examples, the MMF bundle 210 includes poled optical fibers or micro-structured fibers infiltrated with liquid crystals for electro-optic modulation of the refractive index. These examples are for illustrating purposes only. In practice, any other types of fibers known in the art can also be used here.

In some examples, the modulator 220 can change the refractive index of the MMF bundle 210 by about 2×10$^{-4}$ to about 2×10$^{-3}$ for each step. In some examples, the modulator 220 can change the refractive index of the MMF bundle 210 by about 5×10$^{-4}$ to about 1×10$^{-3}$ for each step.

FIG. 2A shows that detector 230 is directly coupled to the MMF bundle 210 for illustrating purposes only. In practice, due to the light guiding structure employed (e.g., a fiber bundle), the detector 230 can be flexibly positioned to allow compact system integration and/or assembly, thereby allowing simplified imaging system design with enhanced optical performance. For example, the MMF bundle 210 and/or the SMF bundle 240 can be stowed, bent, or twisted before coupling to the detector 230 so as to achieve the desired form factor.

In some examples, the system 200 can be used in applications such as hyperspectral and multispectral imaging. In some examples, the system 200 can be incorporated in an optical endoscope to collect spectroscopic information. The spectroscopic information can be collected by, for example, coherent Raman scanning fiber endoscopy. In some examples, one or more of the fibers in the SMF bundle 240 and the MMF bundle 210 can be used as an illumination source, while other fibers can be used to receive light for spectral imaging.

Spectral Imaging Systems Including Planar Waveguides

Figure 3:
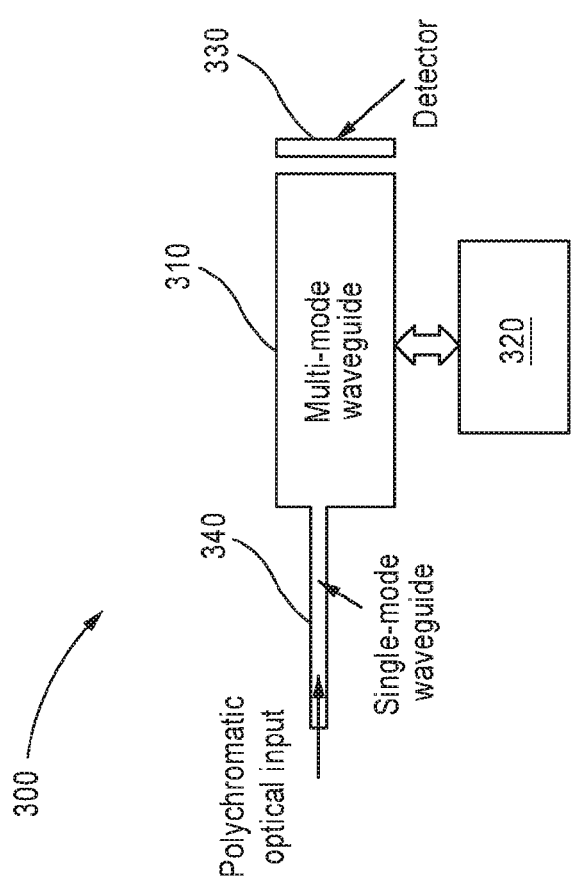
FIG. 3 shows a schematic of a spectral imaging system including a single mode waveguide and a multimode waveguide.

FIG. 3 illustrates a spectral imaging system 300 using planar waveguides. The system 300 includes a single mode waveguide 340 to receive light reflected or scattered from an object or scene (not shown in FIG. 3) to be imaged. The light then propagates into a multimode waveguide 310, which can generate optical patterns comprising multiple optical modes of the light. A modulator 320 is operably coupled to the multimode waveguide 310 to modulate the refractive index of the multimode waveguide 310 so as to generate different optical patterns, each of which corresponds to a distinct refractive index of the multimode waveguide 310. A detector 330 is disposed at the output of the multimode waveguide 310 to detect the optical patterns and to generate spectral images of the object based on the multiple optical patterns. During operation, the optical guiding properties of the multi-mode waveguide can be modulated by, for example, heating or electro-optic tuning. The output intensity from the multimode waveguide 310 can be recorded by the detector 330. The spectral information can then be extracted by performing a linear transform following similar protocols as described above.

In some examples, the multimode waveguide 310 can be used as a standalone spectrometer, i.e., the multimode waveguide 310 can be detached from the detector 330. This approach may allow flexible construction of imaging systems in view of practical requirements (e.g., form factor, desired resolution, etc.). In some examples, the multimode waveguide 310 can be integrated with the detector 330. For example, the multimode waveguide 310 and the detector 330 may be fabricated on the same semiconductor substrate via a single fabrication process. The resulting system can be compact and robust.

Spectral Imaging Systems Including Phase Change Layers

Figure 4:
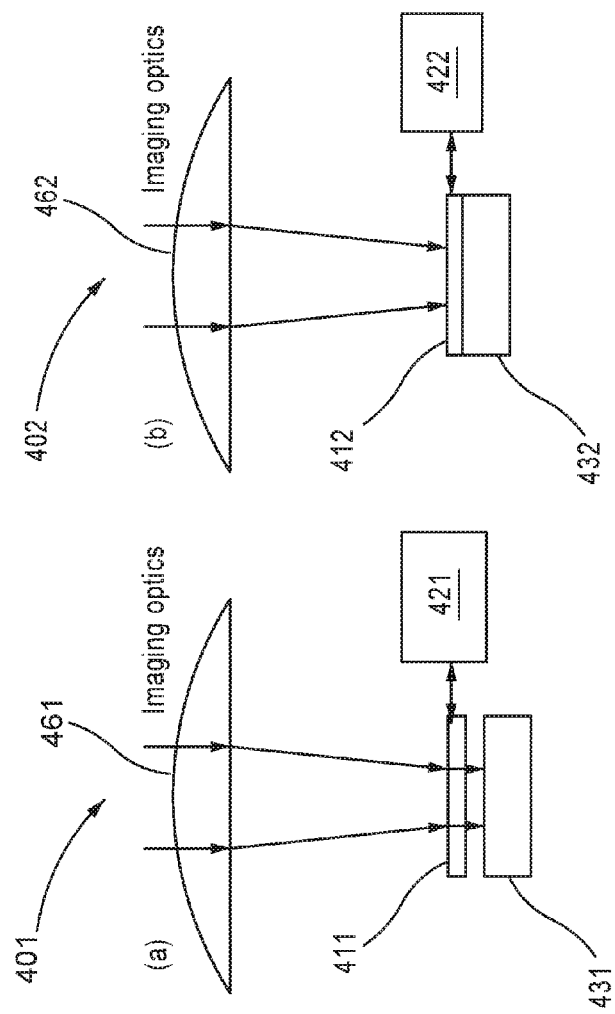
FIGS. 4A-4B show schematics of spectral imaging systems using thin-film filters.

FIGS. 4A-4B illustrate spectral imaging systems including phase change layers. FIG. 4A shows a system 401 that includes imaging optics 461 to collect light reflected or scattered from an object (not shown in FIG. 4A) to be imaged. The collected light then propagates to a tunable filter 411, which is operably coupled to a modulator 421. The modulator 421 modulates the refractive index of the tunable filter 411 such that different optical patterns can be generated from the light, each of which corresponds to a distinct refractive index of the tunable filter 411. A detector 431 then detects the optical patterns and generates the spectral image of the object using methods as described above. In FIG. 4A, the tunable filter 411 is detached from the detector 431.

FIG. 4B shows a spectral imaging system 402 similar to the system 401, except that a tunable filter 412 is integrated with a detector 432 to create optical patterns from light collected by an imaging optics 462. In some examples, the tunable filter 412 includes a thin-film filter deposited onto the surface of the detector 432.

In these systems, the broadband tunable filter 411 and 412 function as the filter 110 shown in FIG. 1. Optical transmittance of the filter can provide the transformation function T in equation (1). To perform multispectral imaging, the filter is tuned across a multitude of N states each having a unique optical transmittance T. Light intensity values at the detector pixels can be sequentially recorded for all N states. A linear transformation can then be performed to extract the spectral information at N wave bands from the recorded intensity values at N filter states.

Figure 5:
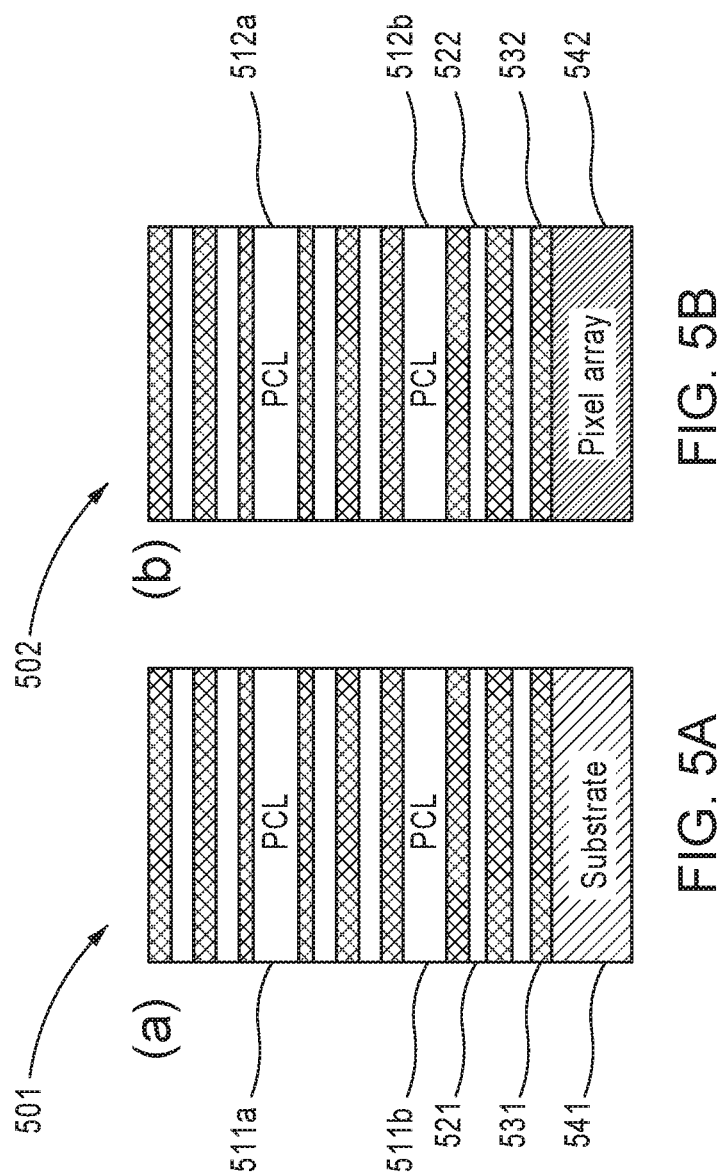
FIGS. 5A-5B show thin-film filters including phase change layers that can be used in the system shown in FIGS. 4A-4B.

FIGS. 5A-5B show structures of tunable filters that can be used in the systems 401 and 402. FIG. 5A shows a tunable filter 501 including a first phase change layer 511a and a second phase change layer 511b. The two phase change layers 511a and 511b are separated by and substantially enclosed in alternating layers 521 and 531. In some examples, the alternating layers 521 and 531 are dielectric layers to protect the phase change layers 511a and 511b. The multiple layers, including the phase change layers 511a/b and alternating layers 521/531, are deposited on a substrate 541. In operation, this tunable filter 501 can be a free-standing filter and can be flexibly coupled into and decoupled from spectral imaging systems.

FIG. 5B shows a tunable filter 502 similar to the tunable filter 501, except that the layers, including phase change layers 512a/b and alternating layers 522/532, are deposited directly on a pixel array 542 (or generically a detector). In this case, the pixel array 542 and the multiple layers can be fabricated at the same time to achieve a compact and robust imaging system.

The optical properties of the phase change layers (PCLs) 511a/b and 512a/b can be adjusted by modifying the phase composition of the PCLs. The optical properties of the PCLs can be tuned over a wide range, resulting in distinctively different optical transmittance states of the filter. In some examples, the phase change layers comprise chalcogenide alloys (e.g. GeSbTe or GST) with amorphous-crystalline transformation. In other examples, the phase change layers comprise Mott insulators (e.g. $VO_2$) which can undergo metal-insulator transformation.

Phase transition in these phase change layers can be triggered via mechanical actuation, electric field driven (non-heating) transformation, resistive heating, laser annealing/heating, or magnetic actuation. These phase change materials can exhibit a large optical property change ($\Delta n$, k>1) upon phase transition. In addition, the phase transition in these materials is generally a continuous process and thus can be used to define more than multiple optical states (e.g., greater than 3, greater than 10, or greater than 20), each of which corresponds to a mixture of two phases. As described above, the number of distinct refractive indices can be related to the number of spectral channels in the imaging system. Therefore, a continuous phase change process can result in a large number of spectral channels, thereby achieving high spectral resolution. A multitude of optical states can be well defined by controlling the kinetics of phase transition. Since spectral imaging based on these tunable filters can use constant cycling of the phase change materials, common issues associated with these phase change materials such as long-term drift and hysteresis may not be a concern for the imaging application. High refractive indices of these materials can also result in reduced or minimal angular variation of the spectral characteristics of the filter.

Methods of Spectral Imaging Based on Modulation of Refractive Index

Figure 6:
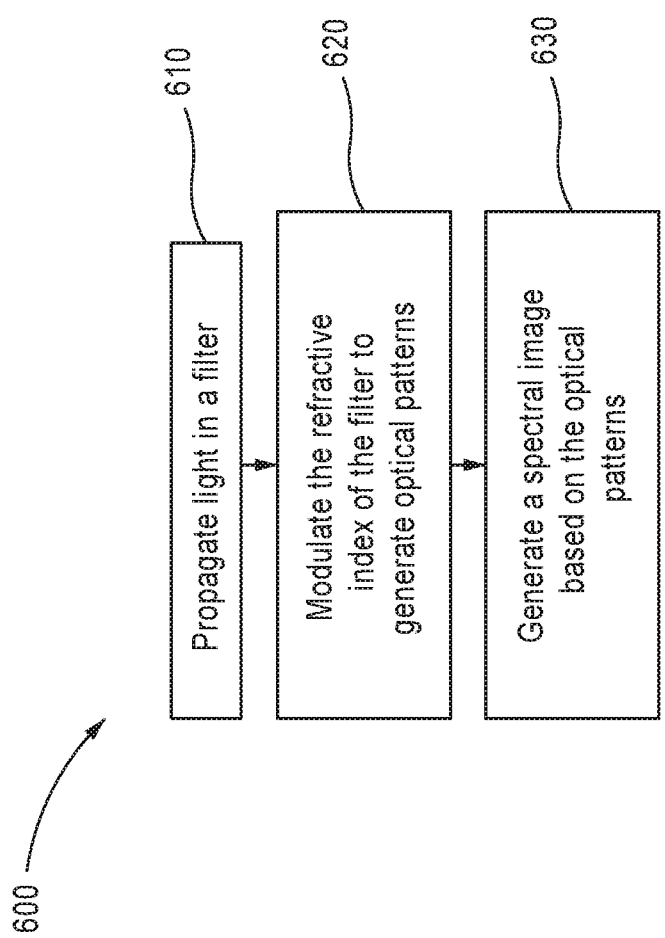
FIG. 6 illustrates a method of spectral imaging using refractive index modulation.

FIG. 6 illustrates a method 600 for spectral imaging based on the modulation of refractive index. At step 610 in the method 600, light reflected or scattered from the object to be imaged in propagating in a filter. The filter can comprise any of the filters described above, including monolithic filters, multilayer filters, waveguide(s), and fiber(s).

At step 620, a plurality of optical patterns is generated by modulating a refractive index of the filter. Each optical pattern in the plurality of optical patterns corresponds to a respective refractive index of the filter. The modulation can be carried out by any methods described above, including mechanical methods, electro-optic methods, acousto-optic methods, magneto-optic methods, and thermo-optic methods.

At step 630, a spectral image of the object is generated based at least in part on the plurality of optical patterns. The spectral image can be reconstructed by taking an inverse linear transform of the optical patterns according to equation (2) or by taking the summation of the optical patterns according to equation (3).

FIGS. 7A-7C illustrate methods of constructing spectral images from spatial images taken with different refractive indices in a filter. FIG. 7A shows the spectral image information $I(\lambda)$ of an object that is imaged by the methods and systems described in this application. This spectral image information $I(\lambda)$, after passing thorough filters, is transformed into detected signals $S(n)=T(\lambda, n)*I(\lambda)$, where $T(\lambda, n)$ is the transmission function of the filter. The signals are recorded by detectors, as shown in FIG. 7B. A plurality of signals $S(\lambda, n_1)$, $S(\lambda, n_2)$ ... to $S(\lambda, n_k)$ can be taken, each of which corresponds to a distinct refractive index $(n_1, n_2, \ldots n_k)$ of the filter. FIG. 7C shows that the spectral image information $I(\lambda)$ can be reconstructed by an inverse transform:

$$I(\lambda)=\int_n T^{-1}(\lambda,n)\cdot S(n)dn \qquad (6)$$

Since a plurality of signals $S(n)$ is taken, the integral in equation (6) can be approximated by a summation:

$$I(\lambda)=\Sigma_{n1}{}^{n2}T^{-1}(\lambda,n)\cdot S(n)\Delta n \qquad (7)$$

where $n_1$ to $n_2$ is the range of refractive index of the filter scanned in FIG. 7B. $\Delta n$ is the difference of refractive index between adjacent modulation steps.

Systems and methods described above use optical wavelengths as illustrating and non-limiting examples. In practice, these systems and methods can be extended to other wavelengths for imaging. Example wavelengths include, but are not limited to, Terahertz (THz) region, x-ray region, and radio frequency (RF) region, among others.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of" "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus for generating a spectral image, the apparatus comprising:

a filter to receive incident light, the filter having a variable refractive index;

a modulator, operably coupled to the filter, to modulate the variable refractive index of the filter so as to generate a plurality of optical patterns from the incident light, the plurality of optical patterns representing the spectral image, each optical pattern in the plurality of optical patterns corresponding to a different modulation of the variable refractive index; and a detector, in optical communication with the filter, to detect the plurality of optical patterns.

2. The apparatus of claim 1, wherein the modulator is configured to apply at least one of a mechanical force, an electric field, a thermal field, or an acoustic field to the filter so as to modulate the variable refractive index of the filter.

3. The apparatus of claim 1, further comprising:

a processor, operably coupled to the detector, to generate the spectral image based at least in part on the plurality of optical patterns.

4. The apparatus of claim 1, wherein the filter comprises a multimode waveguide and wherein each optical pattern in the plurality of optical patterns is formed by at least two optical modes of the multimode waveguide.

5. The apparatus of claim 4, further comprising:

liquid crystal material, disposed at least partially in the multimode waveguide, to provide the variable refractive index.

6. The apparatus of claim 4, wherein the multimode waveguide has a length of about 5 cm to about 50 cm.

7. The apparatus of claim 4, wherein the modulator is configured to modulate the variable refractive index of the multimode waveguide by about $10^{-4}$ to about $10^{-2}$.

8. The apparatus of claim 4, wherein at least one optical pattern in the plurality of optical patterns is formed by about 10 to about 250 optical modes of the multimode waveguide.

9. The apparatus of claim 4, further comprising:

at least one single-mode waveguide, in optical communication with the multimode waveguide, to receive the incident light and to couple the incident light into the multimode waveguide.

10. The apparatus of claim 9, wherein the at least one single-mode waveguide comprises a bundle of single-mode fibers.

11. The apparatus of claim 10, further comprising:

a micro-lens array, in optical communication with the bundle of single-mode fibers, to couple the incident light into the bundle of single-mode fibers.

12. The apparatus of claim 10, wherein the bundle of single-mode fibers comprises a curved end surface to reduce aberration of the light.

13. The apparatus of claim 4, wherein the multimode waveguide comprises a bundle of multimode fibers.

14. The apparatus of claim 1, wherein the filter comprises a phase change layer and the modulator is configured to modulate a phase composition of the phase change layer so as to modulate the variable refractive index.

15. The apparatus of claim 14, wherein the phase change layer comprises at least one of a chalcogenide alloy or a Mott insulator.

16. The apparatus of claim 14, further comprising:

an imaging optic, in optical communication with the filter, to image the incident light onto the filter.

17. A method of producing a spectral image of an object, the method comprising:

filtering light reflected or scattered from the object with a filter;

modulating a refractive index of the filter so as to generate a plurality of optical patterns, each optical pattern in the plurality of optical patterns corresponding to a respective refractive index of the filter;

detecting the plurality of optical patterns; and generating the spectral image of the object based at least in part on the plurality of optical patterns.

18. The method of claim 17, wherein modulating the refractive index of the filter comprises applying at least one of a mechanical force, an electric field, a thermal field, or an acoustic field to the filter.

19. The method of claim 17, wherein filtering the light comprises propagating the light in a multimode waveguide, wherein each optical pattern in the plurality of optical patterns is formed by at least two optical modes of the multimode waveguide.

20. The method of claim 19, further comprising:
before filtering the light, transmitting the light to the multimode waveguide via a single mode waveguide.

21. The method of claim 20, wherein transmitting the light to the multimode waveguide comprises transmitting the light through a corresponding single-mode fiber in a bundle of single-mode fibers.

22. The method of claim 21, where in transmitting the light through the corresponding single mode fiber comprises transmitting the light through a curved end surface of the corresponding single-mode fiber so as to reduce aberration of the light.

23. The method of claim 19, wherein propagating the light in the multimode waveguide comprises propagating the light in a bundle of multimode fibers.

24. The method of claim 19, wherein modulating the refractive index of the filter comprises changing the refractive index by about 10' to about 10'.

25. The method of claim 17, wherein generating the plurality of optical patterns comprises generating at least 20 optical patterns.

26. The method of claim 17, wherein generating the spectral image comprises performing a linear transform of the plurality of optical patterns.

27. The method of claim 17, wherein filtering the light comprises propagating the light in a phase change layer, wherein modulating the refractive index comprises modulating a phase composition of the phase change layer.

28. The method of claim 27, wherein the phase change layer comprises at least one of a chalcogenide alloy and a Mott insulator.

29. The method of claim 27, further comprising:
transmitting the light through an imaging lens, wherein the filter is disposed approximately at a focal plane of the imaging lens.

30. An apparatus for imaging an object, the apparatus comprising:
an imaging lens to collect light reflected or scattered from the object;

a bundle of single mode fibers, disposed at a focal plane of the imaging lens, to receive the light collected by the imaging lens;

a bundle of multimode fibers, in optical communication with the bundle of single mode fibers, to generate an optical pattern from the light collected by the imaging lens, the optical pattern formed by at least two optical modes propagating in each multimode fiber in the bundle of multimode fibers;

a modulator, operably coupled to the bundle of multimode fibers, to change a refractive index of the bundle of multimode fibers so as to change the optical pattern; and a detector, in optical communication with the bundle of multimode fibers, to detect the optical pattern.

* * * * *

UNITED STATES PATENT AND TRADEMARK OFFICE
CERTIFICATE OF CORRECTION

PATENT NO. : 10,240,980 B2  
APPLICATION NO. : 15/602323  
DATED : March 26, 2019  
INVENTOR(S) : Hu et al.

Page 1 of 1

It is certified that error appears in the above-identified patent and that said Letters Patent is hereby corrected as shown below:

Column 19; In Claim 24, Line 33, replace "10' to about 10'" with --$10^{-4}$ to about $10^{-2}$--.

Signed and Sealed this  
Thirteenth Day of August, 2019

Andrei Iancu  
*Director of the United States Patent and Trademark Office*